US 6,669,041 B2

(12) United States Patent
Almond

(10) Patent No.: US 6,669,041 B2
(45) Date of Patent: Dec. 30, 2003

(54) TELECOMMUNICATION AND ELECTRICAL SERVICE BOX FOR MOUNTING IN A FLOOR

(75) Inventor: Gordon S. Almond, Kelowna (CA)

(73) Assignee: Spider Manufacturing Inc., Kelowna ( * ) Notice: Subject to any disclaimer, the term of this patent is extended or adjusted under 35 U.S.C. 154(b) by 82 days.

(21) Appl. No.: 10/103,994

(22) Filed: Mar. 25, 2002

(65) Prior Publication Data
US 2003/0178421 A1 Sep. 25, 2003

(51) Int. Cl.[7] .................................................. H02G 3/14
(52) U.S. Cl. ............................ 220/3.6; 220/3.8; 220/3.9
(58) Field of Search ......................... 220/3.3, 3.5, 3.6, 220/3.8, 3.9

(56) References Cited

U.S. PATENT DOCUMENTS

| 2,320,400 | A |   | 6/1943  | Bedell            |
| 2,357,787 | A |   | 9/1944  | Windsheimer       |
| 3,485,933 | A |   | 12/1969 | Flachbarth        |
| 3,844,440 | A |   | 10/1974 | Hadfield et al.   |
| 4,057,164 | A |   | 11/1977 | Maier             |
| 4,120,416 | A | * | 10/1978 | Suk ........................ 220/3.4 |
| 4,332,330 | A | * | 6/1982  | Lockwood .................. 220/3.5 |
| 4,408,696 | A | * | 10/1983 | Crosson ...................... 220/3.6 |
| 4,723,746 | A | * | 2/1988  | Gould et al. ............. 248/205.1 |
| 5,221,814 | A |   | 6/1993  | Colbaugh et al.   |
| 5,257,487 | A |   | 11/1993 | Bantz et al.      |
| 5,449,859 | A |   | 9/1995  | Bordwell          |
| 5,860,548 | A | * | 1/1999  | Kerr, Jr. ...................... 220/3.2 |
| 6,102,360 | A |   | 8/2000  | Clegg et al.      |
| 6,346,674 | B1|   | 2/2002  | Gretz             |

* cited by examiner

Primary Examiner—Joseph M. Moy
(74) Attorney, Agent, or Firm—Antony C. Edwards

(57) ABSTRACT

A service box for mounting in a floor includes a rigid container having walls and a lid for covering an upper opening in the container. The opening provides access into a cavity defined by the container. The container has access apertures in the walls for receiving service conduits such as cables, wires, or the like therethrough. The walls include sides which are closely adjacent the floor when the container is mounted in the floor. The container is adapted for mounting of service outlets in the cavity in service communication, that is, electrical communication or telecommunication with the service conduits. At least one recess is formed in the sides. Each recess has a side opening exposing the recess horizontally outwardly of the sides. An elongate first threaded member such as a bolt is rotatably and generally vertically mounted within each recess. An operative end of the first threaded member, such as the head of the bolt, is exposed into the cavity of the container so as to be accessible through the upper opening of the container for operative engagement of the operative end by a user to rotate the first threaded member about its longitudinal axis. An elongate cantilevered member is threadably mounted at a first end thereof onto the first threaded member.

16 Claims, 4 Drawing Sheets

TELECOMMUNICATION AND ELECTRICAL SERVICE BOX FOR MOUNTING IN A FLOOR

FIELD OF THE INVENTION

This invention relates to a telecommunication and electrical service box which may be mounted recessed into the floor of a building so that telecommunication, electrical and other services provided by wires, cables or the like may be conveniently supplied in close proximity to a work station.

BACKGROUND OF THE INVENTION

The modern work station of an office contains an assortment of electrically operated hardware each requiring one or more separate connections to electrical, and telecommunication outlets, including computer network or internet outlets. Such outlets may not be conveniently located in relation the work station, requiring that the electrical cords inconveniently extend along the surface of the floor between the equipment and the outlet. Such cords, then, can become an inconvenience and a potential hazard to those walking near the work station. Additionally they may become accidentally detached from the outlet resulting in inconvenience to the user and possible loss of data.

SUMMARY OF THE INVENTION

The telecommunication and electrical service box of the present invention assists in overcoming the undesirable and inconvenient aspects of having the electrical cords extend along the surface of the floor by providing a service box, containing a plurality of electrical, telephone and computer network outlets, which may be positioned within a floor in proximity to a work station.

Further the service box is mountable within a recess in the floor so as to have the upper surface of the access lid generally flush with the surrounding floor. The lid is provided with a recess, which will accept surface floor covering material such as carpet or tile, which results in the service box becoming inconspicuous when in place.

The telecommunication and electrical service box can be simply and conveniently secured in place by retaining clamps positioned off-center within a recessed portion of opposite side walls. In the normal position the clamps lie nested within their respective recess, permitting the service box to be easily inserted with the floor aperture. Clockwise rotation of a threaded adjusting bolt, accessible from within the service box with the lid raised, rotates a clamp arm outwardly of the recess engaging a wall side of the recess. Further rotation of the adjusting bolt results in the raising of the clamp arm on the threaded adjusting bolt until firm engagement is made with the underside of the floor. Counter clockwise rotation of the threaded adjusting bolt results in the lowering of the clamp arm until it is free of the underside of the floor at which point it rotates to nest within its respective recess allowing easy removal of the service box from the floor aperture.

The telecommunication and electrical service box is thus for flush mounting within a floor. It has a base, upstanding perimeter walls defining an internal cavity, a perimeter supporting flange secured to and extending outwardly generally at right angles to the perimeter walls adjacent the void opening and a lid, hinged at one side of the service box and having a hinged, cushioned handle at the other, which nests snugly within the walls to enclose the cavity. Connecting cables pass outwardly from under the handle portion of the lid to equipment at the work station. Padding on the underside of the handle inhibits abrading or crimping of the connecting cables.

Corner brackets secured within the service box limit the downward travel or deflection of the lid.

The perimeter walls contain a plurality circular scored knock out areas which provide access for electrical and communication cables.

Inwardly projecting recesses are generally positioned at the mid point on a single pair of opposed side walls. A retaining clamp is rotatably positioned within each of the recesses in proximity to one of the sides of the recess. The retaining clamps comprise a threaded adjusting bolt which is freely, rotatably mounted to the service box and accessible from inside the service box, a clamp arm which is threadably mounted to the threaded bolt and a compensating screw threaded to the distal end of the clamp arm. In the normal position the clamps lie nested within their respective recess, permitting the service box to be easily inserted within a floor aperture to be supported therein by the outwardly extending perimeter flange.

As described above, rotation of the adjusting bolt in a clock wise direction rotates the clamp arm outwardly of the recess until its rotation is arrested by contact with a side of the recess. Since the retaining clamp is mounted closer to the side of the recess which is in the clockwise direction, the clamp arm is generally at right angles to the side wall at the point of rotational arrest. Continued rotation of the adjusting bolt results in the clamp arm being drawn upwardly on the adjusting bolt toward the perimeter supporting flange and the underside of the floor. The compensating screw may be adjusted for the variety of floor thicknesses which will be encountered, so that the service box may be held firmly in place.

Opposed facing electrical and telecommunication outlet mounting frames are secured within the electrical service box to the pair of opposed side walls containing the adjusting bolt recess. Each mounting frame may be compartmentalized by an intermediate plate which contains a wiring knockout. Electrical and telecommunication outlets are fastened to the opposed facing mounting frames. The faces of the mounting frames may be inclined slightly upwardly for ease of access to the outlets.

In summary, the service box of the present invention which is adapted for mounting into a floor, may be characterized as including a rigid container having walls and a lid for covering an upper opening in the container. The opening provides access into a cavity defined by the container. The container has access apertures in the walls for receiving service conduits such as cables, wires, or the like therethrough. Walls as used herein are meant to include any enclosing frame, structure, housing, box or the like, wherein each of those include sides such as side-walls which are closely adjacent the floor when the container is mounted in the floor. The container is adapted for mounting of service outlets in the cavity in service communication, that is, electrical communication or telecommunication with the service conduits.

At least one recess is formed in the sides. Each recess has a side opening exposing the recess horizontally outwardly of the sides. An elongate first threaded member such as a bolt is rotatably and generally vertically mounted within each recess. An operative end of the first threaded member, such as the head of the bolt, is exposed into the cavity of the container so as to be accessible through the upper opening of the container for operative engagement of the operative end by a user to rotate the first threaded member about its longitudinal axis.

An elongate cantilevered member is threadably mounted at a first end thereof onto the first threaded member. The first threaded member is helically threaded so that rotation of the first threaded member in a first direction about its longitudinal axis urges the cantilevered member in upward translation along the first threaded member. The cantilevered member is threadably mounted in threaded engagement on the first threaded member so that, as the cantilevered member is urged in the upward translation by rotation of the first threaded member in the first direction, the cantilevered member is simultaneously urged to rotate also in the first direction by friction in the threaded engagement between the cantilevered member and the first threaded member.

A stop is formed in each recess. Herein such a stop is meant to include an edge formed along one side of the recess. The stop is for arresting the rotation of the cantilevered member in the first direction once the cantilevered member has rotated to an extended position protruding cantilevered from the recess so as to extend outwardly of the sides of the container. The stop may thus be a generally vertically extending edge of the recess. The first threaded member is rotatable in a second direction opposite the first direction so as to translate the cantilevered member downwardly, and so as to urge, by the threaded engagement, the cantilevered member to rotate also in the second direction into a retracted position nested entirely within the recess. Each recess is sized to receive the cantilevered member nested entirely therein when in its retracted position. In a further embodiment, the container includes a pair of recesses mounted so as to be oppositely disposed on opposite sides of the container.

In one embodiment, the present invention may also include an elongate second member mounted to, so as to extend upwardly from, a second end of the cantilevered member opposite the first end of the cantilevered member. The second member when mounted on the cantilevered member may be generally parallel to the first threaded member. Further, the cantilevered member may include a threaded aperture at its second end. Thus, where the second member is a threaded member, it may be threadably mounted to the cantilevered member in threaded engagement in the threaded aperture so as to be adjustable in vertical relation relative to the cantilevered member. In one embodiment, the cantilevered member may be an arm.

The lid may be pivotable from a closed position closing over the cavity to an open position pivoted upwardly about one edge of the lid. In one embodiment, an access door may be pivotally mounted into an aperture in the lid for running service lines from the cavity, out through the lid and out to the corresponding workstation. An inner surface of the access door may be resiliently lined to protect service lines extending through the aperture in the lid. The reference to resiliently lined is meant to include all forms of padding, lining, or buffering intended to protect the service lines from abrasion or chaffing.

An upper surface of the lid is preferably flush with the flanges when the lid is in the closed position so that the entire upper surface is generally coplanar. A first side of the lid may have a depression in the upper surface sized to receive a piece of floor covering therein so that, with the piece of floor covering mounted in the depression, the upper surface of the floor covering is also flush with the flanges. The lid may be reversibly mounted to the container so as to be reversible between a first orientation wherein the first side is upwardly disposed when the lid is in the closed position and a second orientation wherein an opposite second side is upwardly disposed when the lid is in the closed position. In this embodiment, any access door may also be reversible relative to the lid. The second side may have a different surface contour than the first side, for example the second side may be planar.

In one embodiment the container includes at least one service outlet mounting frame mounted in the cavity for mounting of service outlets thereto. The mounting frames may be an opposed facing pair of mounting frames mounted oppositely within the cavity. Each mounting frame may have an upwardly inclined outlet face so as to dispose outlets mounted to each mounting frame upwardly towards the upper opening.

DETAILED DESCRIPTION OF EMBODIMENTS OF THE INVENTION

Figure 1:
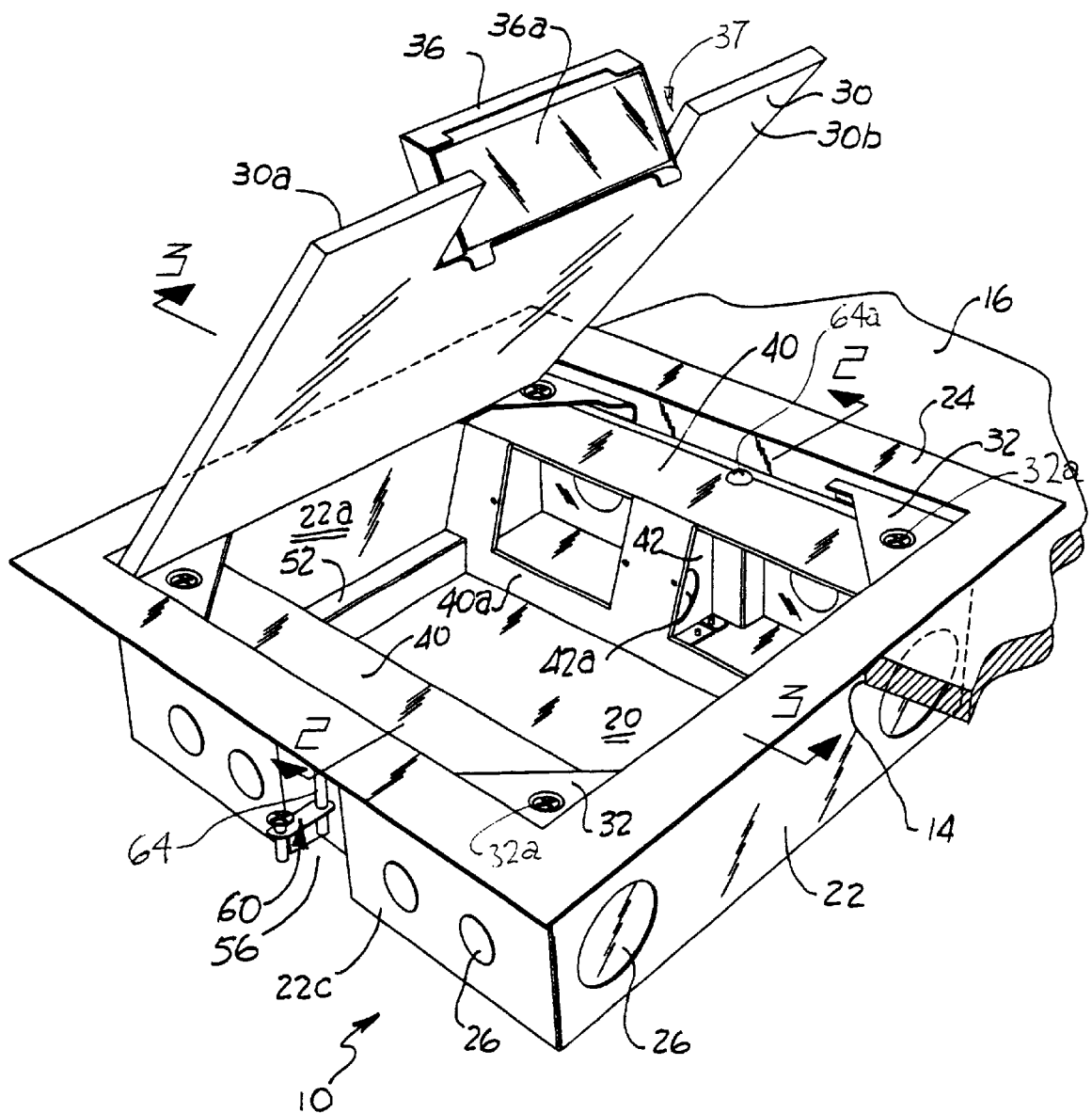
FIG. 1, is perspective view of the telecommunication and electrical service box of the present invention.
Figure 2:
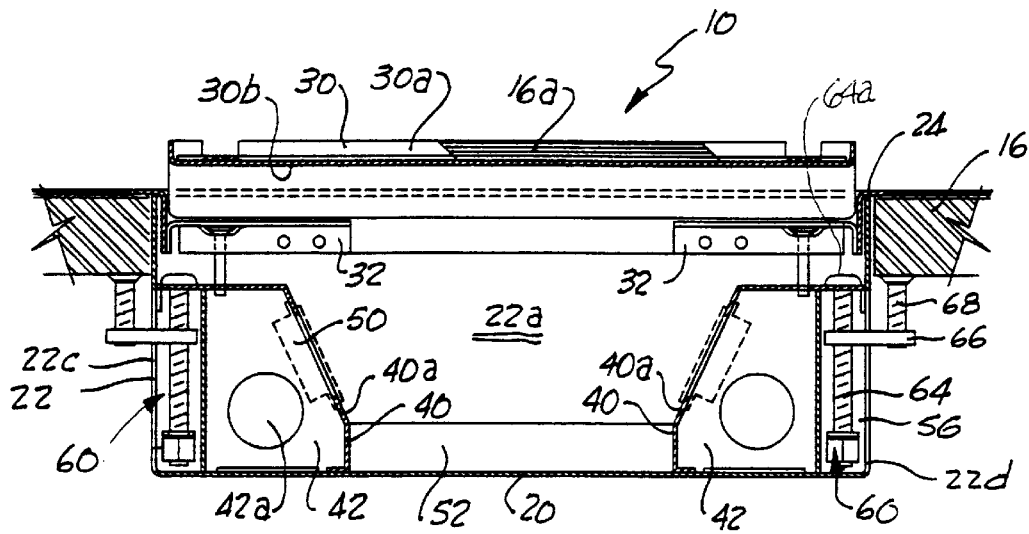
FIG. 2 is a sectional view taken on line 2—2 of FIG. 1
Figure 3:
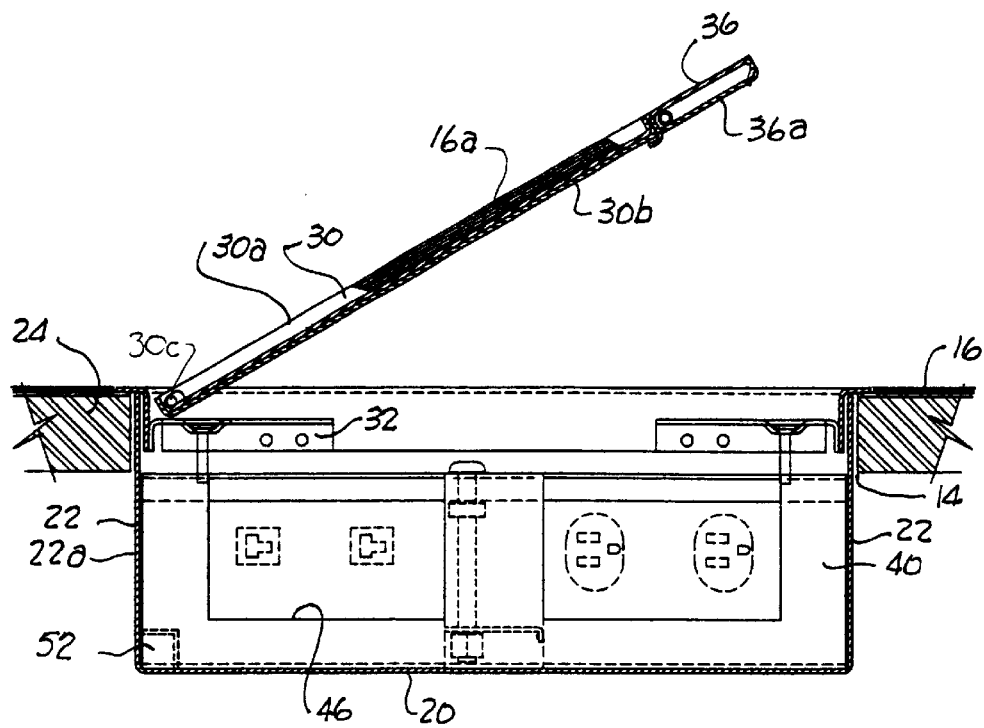
FIG. 3 is a sectional view taken on line 3—3 of FIG. 1
Figure 4:
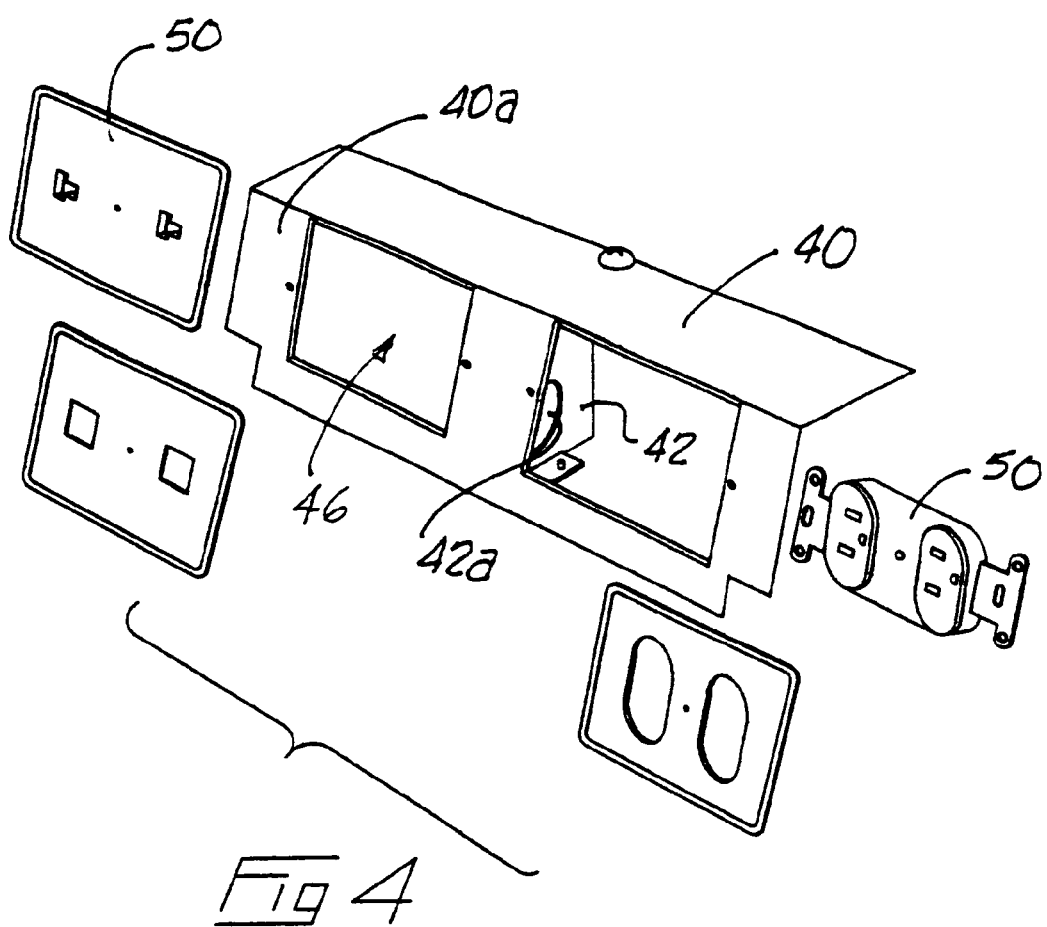
FIG. 4 is an exploded perspective view of the outlet mounting frame.
Figure 5:
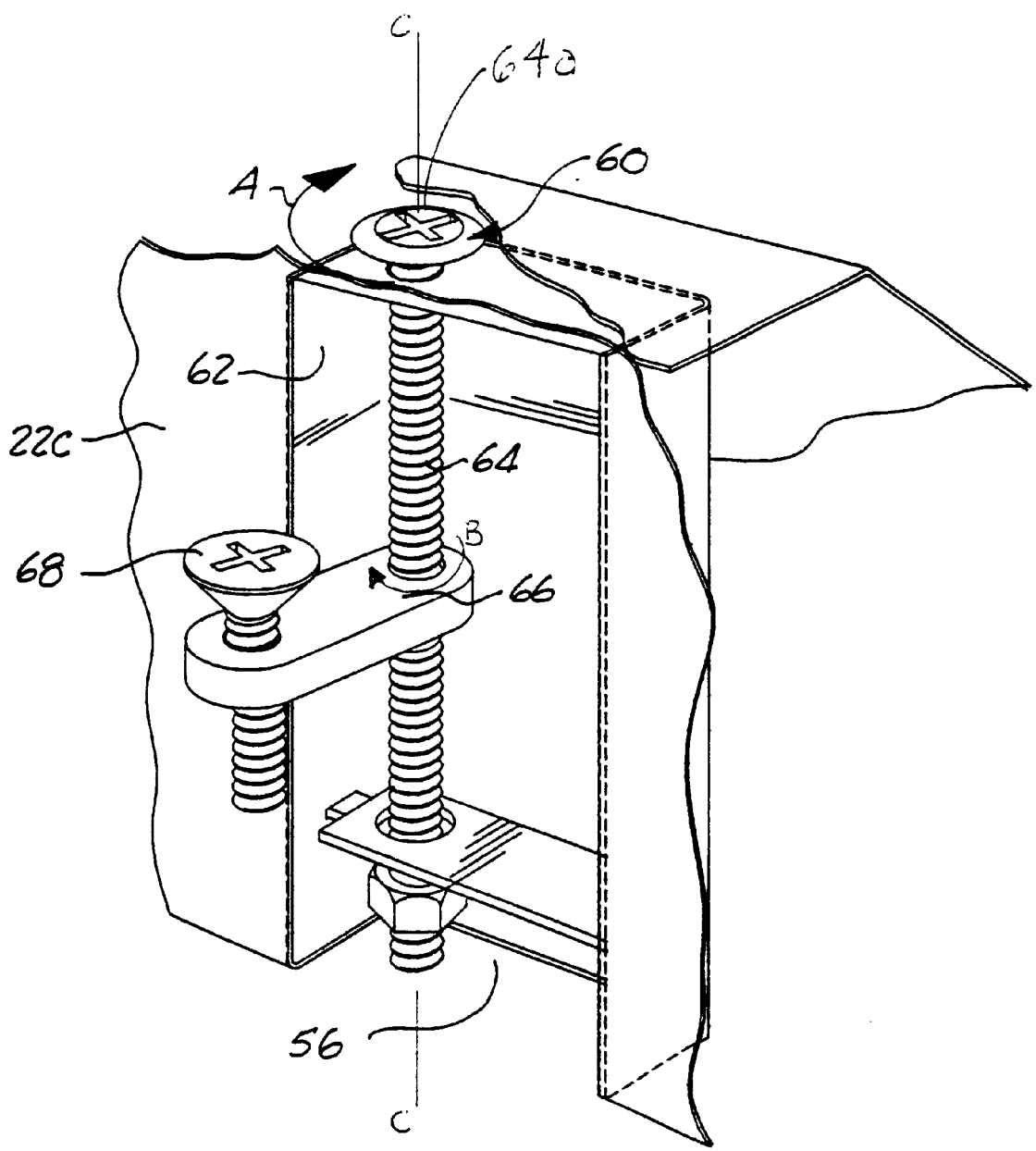
FIG. 5 is a perspective view, partially cut away, of the retaining clamp.

Referring to the drawings wherein similar characters of reference denote corresponding parts in each view, telecommunication and electrical service box 10, is mountable into an aperture 14 formed in a floor 16. Service box 10 has a base 20 with upstanding perimeter walls 22. Support flange 24 extends outwardly from upper edge of walls 22. Walls 22 have scored electrical knock-out plates 26 which may be removed from the walls to leave holes through which electrical and communication cables may be inserted.

A reversible lid 30 is hingedly mounted adjacent to wall 22a within service box 10 so that an upper surface of the lid is generally co-planar with the upper surface of flange 24. A first side 30a of lid 30, when positioned uppermost, is recessed to accommodate within the thickness of the lid the section of floor covering 16a removed from the floor during the cutting of aperture 14. A second, opposite side 30b of lid 30 when positioned uppermost, presents a smooth surface covering service box 10. In both cases, with either side 30b uppermost or with side 30a uppermost and containing floor covering 16a, the upper surface is flush with the support flange.

Corner brackets 32 are mounted within service box 10. They support the corners of lid 30 when in its closed position to inhibit deflection of the lid under a weight load. A handle 36 is hingedly mounted to lid 30 at the mid point of side 22b opposite to the hinged mounting by hinge 30c of lid 30 to service box 10. Handle 36 may also be reversible to accommodate when lid 30 is reversed. The handle may be provided with a cushioned under-surface 36a. For example under-surface 36a may be lined with a layer of foam rubber or other resilient material. Thus, as connecting cables pass through the aperture 37 closed by the pivoting of handle 36 into its closed position, the cushioned underside inhibits abrading or crimping of the cables caused by contact of the cables with the handle.

Secured within electrical service box 10 are two opposed electrical and telecommunication outlet mounting frames 40. The ends of each mounting frame 40 are secured to corresponding corner brackets 32 by bolts or screws 32a. Frames 40 may each be compartmentalized by an intermediate plate 42, which contains a wiring knockout plate 42a. Each mounting frame 40 may have an upwardly inclined face 40a within which are formed rectangular apertures 46. Apertures 46 permit electrical and telecommunication outlets 50 and their associated face plates to be fastened to mounting frames 40 within apertures 46. Mounting frames 40 are interconnected by wiring conduit 52 to accommodate wiring which may have to be run between the opposed facing mounting frames. For example, conduit 52 may be mounted adjacent to wall 22a.

Recesses 56, which may be indentations, depressions, channels, grooves or the like, are set back into perimeter walls 22. Recesses 56 may for example be positioned at the mid points of opposite side walls 22c and 22d. A retaining clamp generally indicated by the numeral 60 is housed in each recess 56. Retaining clamp 60 is mounted within each recess 56 in proximity to one side 62 of the recess. Retaining clamp 60 includes a threaded adjusting bolt 64 freely and rotatably vertically mounted in recess 56. The head 64a of the bolt is accessible from inside the service box. A cantilevered elongate clamp arm 66 having threaded apertures at opposite ends is threaded onto bolt 64 through one of its threaded apertures. Compensating screw 68 is threaded through the threaded aperture in the distal end of clamp arm 66 so as to be parallel to bolt 64. Recesses 56 are of sufficiently large size so that bolt 64, and both arm 66 and screw 68 when in their retracted position, fit nested entirely within the recesses. Thus, in the retracted position with clamps 60 entirely nested within their respective recesses 56, service box 10 may be easily inserted within a snugly fitting floor aperture 14, without interference from protruding arms 66, so as to be supported therein by the outwardly extending perimeter flange 24.

Once box 10 is fully inserted into the floor aperture, adjusting bolt 64 is rotated in a clockwise direction, that is, in direction A. The friction of the threaded part of arm 66 onto bolt 64 causes clamp arm 66 to rotate in direction B about the longitudinal axis C of bolt 64, outwardly of recess 56 until its rotation is arrested by contact of the arm with side 62 of recess 56. Continued rotation in direction A of threaded adjusting bolt 64 results in the clamp arm 66 being drawn upwardly on bolt 66 by the following of the threads in arm 66 along the spiraling of the threads of bolt 64 toward the perimeter supporting flange 24 and the underside of floor 16. Compensating screw 68 may be adjusted prior to installation of service box 10 as required by the floor thickness, ensuring that service box 10 is held firmly in place. Thus as may be seen, a workman may, with a single screw driver, and without having to get beneath floor 16, install box 10 merely by dropping the box into a snugly fitting hole in a raised floor and reaching into the open box turn bolts 64 clockwise until the head of screw 68 abuts the underside of the floor panel.

Removal of box 10 from the floor is also a simple matter, in the reverse. Rotation of threaded adjusting bolt 64 in a direction opposite to direction A, results in the clamp arm 66 firstly being lowered so as to loosen and detach contact of the head of screw 68 from the underside of floor 16, secondly to rotate arm 66 and screw 68 to their retracted position nested within recess 56 by the action of the friction in the threaded engagement between arm 66 and bolt 64, permitting service box 10 to be removed unobstructed by arms 66.

Side wall 62 acts as a stop to limit rotation of arm 66 in direction A. Rotation of arm 66 in direction A is limited to approximately ninety degrees about axis c so that, in its extended position, arm 66 protrudes cantilevered approximately orthogonally from the side wall of box 10. Thus use of side wall 62 as a stop is not intended to be limiting as other forms of stops will work. For example the stop function of side wall 62 may be replicated by the use of a vertical bar, or flange in the recess cooperating with arm 66, or for example cooperating with a protrusion or notch in arm 66 so long as rotation in direction A is arrested while still allowing vertical translation of arm 66 along bolt 64.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A telecommunication and electrical service box for mounting into a floor comprising:

a rigid container having walls and a lid for covering an upper opening in said container, said opening providing access into a cavity defined by said container, said container having access apertures in said walls for receiving service conduits therethrough, said walls including sides, said container adapted for mounting of service outlets in said cavity in service communication with said service conduits, at least one recess formed in said sidewalls, said at least one recess having a side opening exposing said at least one recess horizontally outwardly of sides, an elongate first threaded member rotatably and generally vertically mounted within said at least one recess, an operative end of said first threaded member exposed into said cavity so as to be accessible through said upper opening for operative engagement of said head by a user to rotate said first threaded member about its longitudinal axis, an elongate cantilevered member threadably mounted at a first end thereof onto said first threaded member, said first threaded member helically threaded so that rotation of said first threaded member in a first direction about said longitudinal axis urges said cantilevered member in upward translation along said first threaded member, said cantilevered member threadably mounted in threaded engagement on said first threaded member so that as said cantilevered member is urged in said upward translation by rotation of said first threaded member in said first direction, said cantilevered member is simultaneously urged to rotate also in said first direction by friction in said threaded engagement, a stop formed in said at least one recess for arresting said rotation of said cantilevered member in said first direction when said cantilevered member is in an extended position protruding cantilevered from said at least one recess so as to extend outwardly of said side wall, said first threaded member rotatable in a second direction opposite said first direction so as to translate said cantilevered member downwardly and so as to urge, by said threaded engagement, said cantilevered member to rotate also in said second direction into a retracted position nested entirely within said at least one recess, said at least one recess sized to receive said cantilevered member nested entirely therein when in said retracted position.

2. The device of claim 1 further comprising an elongate second member mounted to, so as to extend upwardly from, a second end of said cantilevered member opposite said first end of said cantilevered member, said second member generally parallel to said first threaded member when so mounted to said cantilevered member.

3. The device of claim 2 wherein said cantilevered member includes a threaded aperture at said second end and wherein said second member is a threaded member threadably mounted to said cantilevered member in threaded engagement in said threaded aperture so as to be adjustable in vertical relation relative to said cantilevered member.

4. The device of claim 1 wherein said stop is a generally vertically extending edge of said at least one recess.

5. The device of claim 1 wherein said cantilevered member is an arm, and wherein said first threaded member is a bolt.

6. The device of claim 1 wherein said at least once recess is a pair of recesses mounted so as to be oppositely disposed on opposite sides of said container.

7. The device of claim 1, wherein said container is a box, and wherein said lid is pivotable from a closed position closing over said cavity to an open position pivoted upwardly about one edge of said lid.

8. The device of claim 7 wherein an access door is pivotally mounted into an aperture in said lid for running service lines from said cavity, through said lid and out to the workstation.

9. The device of claim 8 wherein an inner surface of said access door is resiliently lined to protect service lines extending through said aperture in said lid.

10. The device of claim 7 wherein an upper surface of said lid is flush with said flanges when said lid is in said closed position.

11. The device of claim 10 wherein a first side of said lid has a depression in said upper surface sized to receive a piece of floor covering therein so that, with the piece of floor covering mounted in the depression, the upper surface of the floor covering is flush with said flanges.

12. The device of claim 11 wherein said lid is reversibly mounted to said container so as to be reversible between a first orientation wherein said first side is upwardly disposed when said lid is in said closed position and a second orientation wherein an opposite second side is upwardly disposed when said lid is in said closed position, said second side having a different surface contour than said first side.

13. The device of claim 12 wherein said second side is planar.

14. The device of claim 1 further comprising at least one outlet mounting frame mounted in said cavity for mounting of service outlets thereto.

15. The device of claim 14 wherein said at least one mounting frame is an opposed facing pair of mounting frames mounted oppositely within said cavity.

16. The device of claim 15 wherein each mounting frame of said pair of mounting frames has an upwardly inclined outlet face so as to dispose outlets mounted to said each mounting frame upwardly towards said upper opening.

* * * * *